(12) United States Patent
White et al.

(10) Patent No.: US 12,438,835 B2
(45) Date of Patent: Oct. 7, 2025

(54) CONTEXTUAL MESSAGING IN VIDEO CONFERENCE

(71) Applicant: Microsoft Technology Licensing, LLC, Redmond, WA (US)

(72) Inventors: Ryen William White, Woodinville, WA (US); Peter Bailey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/503,712

(22) Filed: Nov. 7, 2023

(65) Prior Publication Data
US 2024/0073162 A1    Feb. 29, 2024

Related U.S. Application Data

(63) Continuation of application No. 17/463,010, filed on Aug. 31, 2021, now Pat. No. 11,848,900.

(51) Int. Cl.
| | |
|---|---|
| *G06F 3/048* | (2013.01) |
| *G06F 3/0481* | (2022.01) |
| *G06V 20/40* | (2022.01) |
| *H04L 51/046* | (2022.01) |
| *H04L 65/403* | (2022.01) |
| *G06V 40/20* | (2022.01) |

(52) U.S. Cl.
CPC .......... *H04L 51/046* (2013.01); *G06F 3/0481* (2013.01); *G06V 20/40* (2022.01); *H04L 65/403* (2013.01); *G06F 2203/04804* (2013.01); *G06V 20/44* (2022.01); *G06V 40/20* (2022.01)

(58) Field of Classification Search
CPC ..... H04L 51/046; H04L 65/403; G06V 20/40; G06F 3/0481
See application file for complete search history.

(56) References Cited

U.S. PATENT DOCUMENTS

| | | | | |
|---|---|---|---|---|
| 10,540,971 | B2* | 1/2020 | Kumar | H04L 12/1827 |
| 10,873,545 | B2* | 12/2020 | Nguyen | G06N 20/00 |
| 11,095,468 | B1* | 8/2021 | Pandey | H04L 12/1831 |
| 11,765,272 | B2* | 9/2023 | Li | H04M 3/5232 |
| | | | | 379/266.01 |
| 11,863,711 | B2* | 1/2024 | Huang | G06F 40/289 |
| 2018/0101823 | A1* | 4/2018 | Nelson | G06Q 10/1095 |
| 2018/0359199 | A1* | 12/2018 | Nguyen | G06N 20/00 |

(Continued)

*Primary Examiner* — David Phantana-angkool
(74) *Attorney, Agent, or Firm* — Schwegman Lundberg & Woessner, P.A.

(57) ABSTRACT

Generally discussed herein are devices, systems, and methods for contextual messaging in a conference. A method can include receiving, by a first user interface, data indicating content of a message, a recipient of the message, and a condition that, when satisfied during the conference, causes the message to be visually displayed during the audiovisual conference, while the conference is being held via an audiovisual conference application, monitoring user contextual data for whether the condition is satisfied, responsive to the condition being satisfied, augmenting audiovisual conference data from the audiovisual conference application to include the message resulting in augmented audiovisual data, and providing, to the recipient on a second user interface of the audiovisual conference application, a view of the augmented audiovisual data.

20 Claims, 6 Drawing Sheets

(56) References Cited

U.S. PATENT DOCUMENTS

| | | | |
|---|---|---|---|
| 2020/0279567 A1* | 9/2020 | Adlersberg | G06F 40/35 |
| 2021/0112022 A1* | 4/2021 | Nguyen | G06F 16/2365 |
| 2021/0158813 A1* | 5/2021 | Sivasubramanian | |
| | | | G06Q 10/107 |
| 2021/0192126 A1* | 6/2021 | Gehrmann | G06N 20/00 |
| 2023/0046881 A1* | 2/2023 | Mishra | H04L 51/18 |
| 2023/0066231 A1* | 3/2023 | White | H04N 7/147 |
| 2024/0073162 A1* | 2/2024 | White | H04L 65/403 |

* cited by examiner

CONTEXTUAL MESSAGING IN VIDEO CONFERENCE

CROSS-REFERENCE TO RELATED APPLICATIONS

This application is a continuation of prior U.S. application Ser. No. 17/463,010, filed on Aug. 31, 2021, which is incorporated by reference herein in its entirety.

BACKGROUND

People spend a lot of time in video and/or audio conferences (referred to herein simply as "conferences") via technology such as Teams® from Microsoft Corporation of Redmond, Washington, United States, and Zoom® from Zoom Video Communications, Incorporated of San Jose, California, United States. A user of conference technology listens to and can optionally view one or more primary speakers. A participant of a conference can access and listen to the conference without video or access the video conference to both view and listen to the conference. The user of the conference may have time to engage with other participants in the conference. However, conference technology often lacks in personalized context for participants. For example, consider a conference about employee health benefits in which company personnel are describing updates to health, dental, vision, or other benefits. Some employees may understand the difference between a high-deductible health plans (HDHPs) linked to health savings accounts (HSAs), health maintenance organization (HMO) plans, preferred provider organization (PPO) plans, or the like, but some may not. Due to time constraints and efficiency concerns, it may not be prudent to explain the differences between these health plans. The participant that is not familiar with the differences in these health plans can be left making an underinformed decision regarding their healthcare. Many other similar circumstances in which personalized context is lacking is experienced daily in conferences.

SUMMARY

A method, device, or machine-readable medium for contextual messaging in an audiovisual conference are provided. The method, device, or machine-readable medium can provide additional context, in the form of a message displayed, to the conference that is not otherwise present in audiovisual conferences. The additional context can provide a reminder, information beyond what is provided in the audiovisual conference, a task to be completed, or the like. The additional context can be conditional, such that the message is only presented if certain conditions are satisfied. The additional context can be participant-specific, such that a participant with a first characteristic and a participant with a second, different characteristic are provided different additional context. Many other details and improvements are provided.

A method for contextual messaging in an audiovisual conference can include receiving, by a first user interface, data indicating content of a message, a recipient of the message, and a condition that, when satisfied during the conference, causes the message to be visually displayed during the audiovisual conference. The method can further include while the conference is being held via an audiovisual conference application, monitoring user contextual data for whether the condition is satisfied. The method can further include, responsive to the condition being satisfied, augmenting audiovisual conference data from the audiovisual conference application to include the message resulting in augmented audiovisual data. The method can further include providing, to the recipient on a second user interface of the audiovisual conference application, a view of the augmented audiovisual data.

The data can further indicate a location on the second user interface to present the message and the content of the message is presented at the location on the second user interface. The method can further include, wherein the audiovisual conference application is executed on a client or a server. The method can further include, wherein the data further indicates a form of the content of the message, the form including a type of presentation of the content, the type including ticker tape, thought bubble, notification, hyperlink, or text box. The form can further include a visual transparency of the content of the message.

The data of the recipient of the message can further include a characteristic condition that indicates that only users that satisfy the characteristic condition receive the content of the message. The data can further include a criterion that defines a further characteristic condition that defines which portions of the content of the message are provided to the recipient. The condition can further include an event occurring in audiovisual data of the conference, the event including a gesture being performed, a phrase being spoken, a time elapsing, check of user contextual information, or an object appearing. The user contextual information can include a job title, education status, expertise, task status, training status, device type, or current location.

The method can further include receiving, by the first user interface, data indicating content of a second message, a second, different recipient of the second message, and a second condition that, when satisfied, causes the second message to be displayed during the conference. The method can further include while the conference is being held via a conference application, monitoring, by the conference application, audiovisual data of the conference for whether the second condition is satisfied. The method can further include responsive to the second condition being satisfied, augmenting the audiovisual data to include the second message resulting in second augmented audiovisual data. The method can further include providing, to the second recipient on a third user interface of the conference application, a view of the augmented audiovisual data. The method can further include, wherein the recipient is only a presenter participant.

A user interface for an audiovisual conference compatible application, can be configured to perform operations comprising receiving data indicating content of a message, a recipient of the message, and a condition that, when satisfied during the conference, causes the message to be visually displayed during the audiovisual conference. The operations can further comprise storing the received data such that, while the conference is being held via an audiovisual conference application, the audiovisual conference application monitors for whether the condition is satisfied and responsive to the condition being satisfied, augments the audiovisual data to include the message resulting in augmented audiovisual data.

The operations can further include receiving data indicating content of a second message, a second, different recipient of the second message, and a second condition that, when satisfied, causes the second message to be displayed during the conference. The operations can further include storing the received data such that, while the conference is being held via an audiovisual conference application, the audiovisual conference application monitors for whether the second condition is satisfied and responsive to the second condition being satisfied, augments the audiovisual data to include the second message resulting in second augmented audiovisual data.

DETAILED DESCRIPTION

Figure 1:
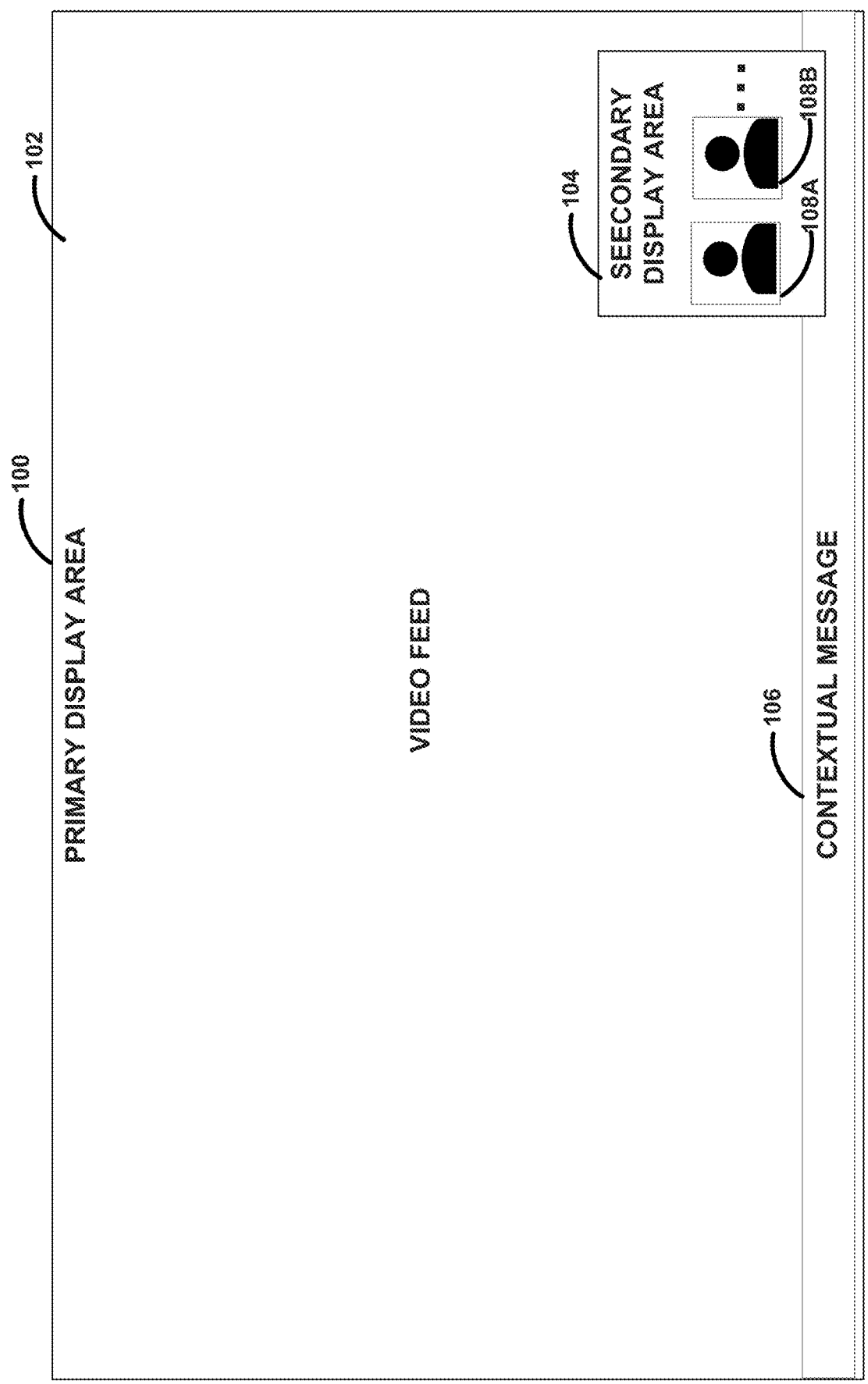
FIG. 1 illustrates, by way of example, a block diagram of an embodiment of a user interface with a contextual message.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

People spend a lot of time in conferencing calls via technology. There is limited information that can currently be conveyed via the audio, video, and chat channels on these calls. Non-speaking participants have additional capacity to consume contextually relevant information. Embodiments can leverage the background around the primary display or in additional parts of the interface of the conference technology (e.g., in a ticker tape format) to present this information.

Contextually relevant information can take the form of reinforcing messages or supplementary messages relevant to (i) the conference (sometimes called a "meeting") in general, (ii) the current dialog to help land a point (e.g., a "For more information, see here" message sent to all or just a subset of participants), (iii) the current point in time (e.g., a "Time to move on" message sent to the speaker only if there are many items in the agenda), or (iv) messages could be left by the speaker to remind themselves of things they ought to do during a meeting (e.g., "Ask everyone in the team for their opinion"). These contextual messages can support the speaker (e.g., help them land a point or provide supplementary information such as reminders, hyperlinks, or bulleted lists) and others on the call (e.g., obtain additional information and reminders).

Teams® makes some limited use of this concept via banner messages (e.g., "5 minutes left in your meeting", "You are recording. Make sure that you let everyone know that they are being recorded.", "Recording has started. Joining the meeting indicates your consent to being recorded."). However, Teams® currently does not consider user data beyond their role in the meeting to provide the messages.

There are at least three modalities for contextual messaging, such as (1) messages shared by the speaker, for consumption by others on the call, (2) messages shared directly to the current speaker, for consumption only by the current speaker, and (3) messages generated automatically by the conference technology (e.g., based on user-provided rules).

Messages in modality #1 can appear in any part of the visual user experience available (e.g., primary conference window, from any part of the speaker's window including speaker background). Messages in modality #2 shared directly to the speaker can be shared from other speakers' windows or backgrounds, or in the primary Teams window; but not in the background of the speaker themselves as it would rely on them looking at themselves which is typically not what the speaker is doing leaving it likely that the speaker does not receive the message. Messages in modality #3 are generated by the system based on content created before and/or during the meeting.

The messages in any modality can be guided by one or more of: (a) Organizational policy and supporting data. For example, all those who had not completed all their trainings could see the following message during an HR call: "Reminder: Complete your required trainings by <date>." (b) User specification. For example, the content of the messages could be provided by the speaker or conference manager in advance of the conference, even tagged with specific key phrases and/or timing to be used to trigger the messages. (c) System inference. For example, the content of the messages can be derived automatically from the meeting agenda, the meeting transcript, or communications in advance of the meeting, such as, reminders of commitments or requests made in email.

The format of the messages (how they are presented) can vary depending on the nature of the message, the nature of the call (e.g., formal meeting vs. informal chat), and the environment. The format can be user defined or vary based on inferences about optimal ways to communicate the message in the current context. The messages can also be actionable (e.g., via clickable hyperlinks).

Reference will now be made to the FIGS. to describe further details of embodiments. The FIGS. illustrate examples of embodiments and one or more components of one embodiment can be used with, or in place of, a component of a different embodiment.

FIG. 1 illustrates, by way of example, a block diagram of an embodiment of a user interface 100 with a contextual message 106. The user interface (UI) 100 is merely an example of a video conference interface and many other variations of UIs are considered relevant to embodiments. The UI 100 includes a primary display area 102 and a secondary display area 104. The primary display area 102 provides a view of the present speaker, a shared document, a meeting organizer, or the like. The primary display area 102 is typically what participants are viewing when they are consuming the meeting. The main content of the meeting is provided through the main display area or a person talking who controls what is presented in the primary display area 102.

The UI 100 further includes a secondary display area 104. The secondary display area 104 can include icons or avatars representing individual attendees of the meeting, camera feeds of the attendees, or a combination thereof. The secondary display area 104 as illustrated includes icons 108A, 108B of the individual attendees, as a simple illustrative example.

The UI 100 further provides a view of a contextual message 106. The contextual message 106 can be different for different participants of the meeting. The contextual message 106 can be provided as a ticker tape sort of message with scrolling text, a text box or other graphic in a portion of the primary display area 102 that is not being utilized to provide content, among others. The contextual message 106 can alternatively be provided on an icon 108A, 108B of the secondary display area 104.

While the secondary display area 104 is illustrated on the primary display area 102, the secondary display area 104 can be situated in a variety of other locations, such as off the primary display area 102. Further, some conferences do not include video, or a user can choose to attend a video conference by calling in and listening to the audio of the conference. The innovations described herein are applicable to those situations as well by substituting an audio message for the graphical message.

Figure 2:
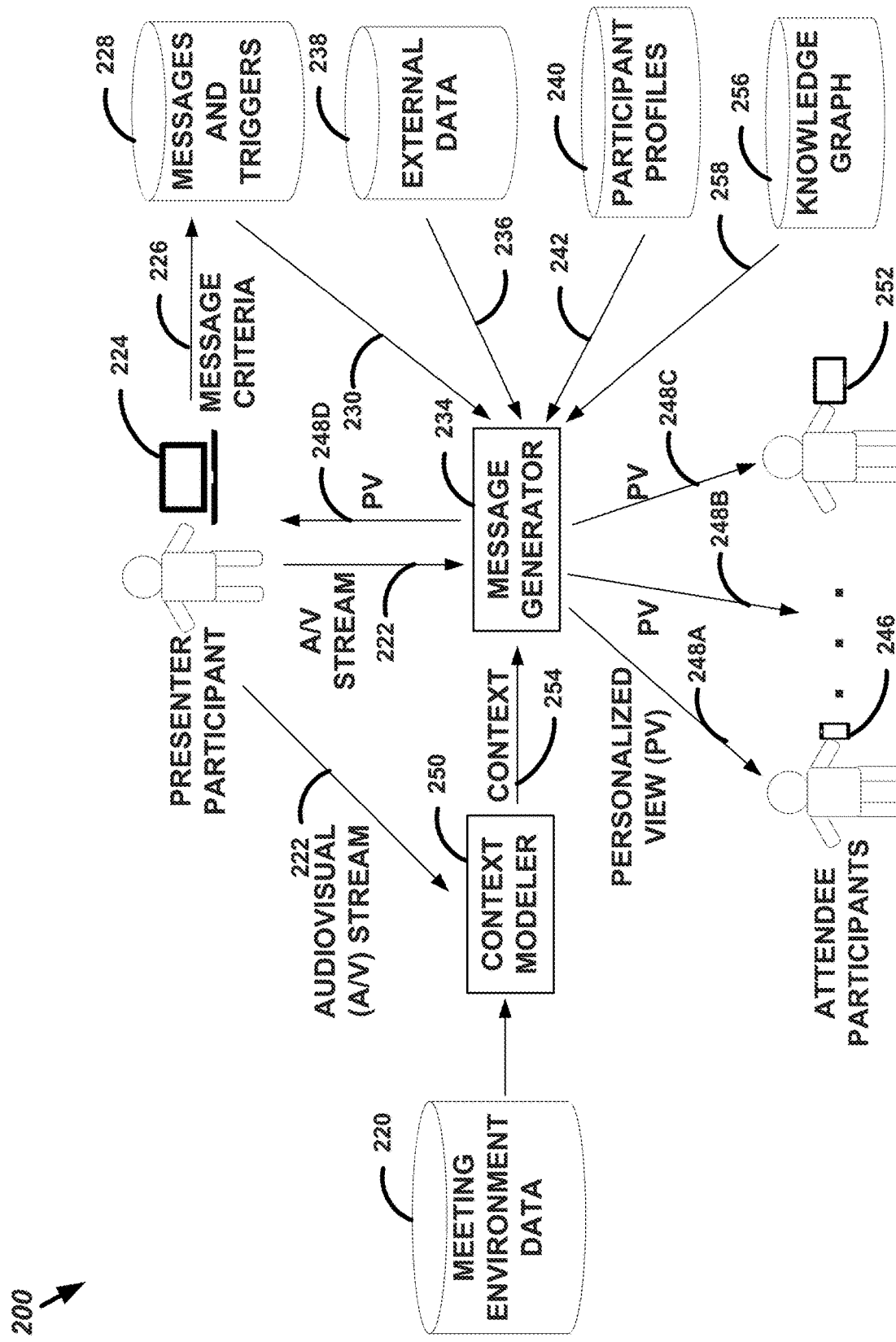
FIG. 2 illustrates, by way of example, a block diagram of an embodiment of a system for contextual messaging in conference calls.

FIG. 2 illustrates, by way of example, a block diagram of an embodiment of a system 200 for contextual messaging in conference calls. The system 200 as illustrated includes a context modeler 250, a message generator 234, and one or more data sources including meeting environment data 220, messages and triggers 228, external data 238, knowledge graph 256, and participant profiles 240. The context modeler 250 can be coupled to the message generator 234 and a presenter participant device 224. The message generator 234 can be coupled to presenter participant device 224 and attendee participant devices 246 and 252. The message generator 234 can provide personalized views (PVs) 248A, 248B, 248C, 248D to participants of the meeting.

The meeting environment data 220 can be accessed by the context modeler 250. The meeting environment data 220 can include a date, time, meeting agenda, invitee list, required attendee list, optional attendee list, participant device information (e.g., make, model, capabilities, or the like), presentation (e.g., a file or other compute resource to be presented), or the like. The context modeler 250 can receive an audio/visual (A/V) stream from one or more devices 224, 246, 252. An A/V stream from each of the devices 246, 252 is not illustrated to not obscure the view provided in FIG. 2., however, such an A/V stream can be provided. Such an A/V is optional as the conference application operating on each of the devices 224, 246, 252 can include video data for each of the participants as this data is typically aggregated at a central server (e.g., in the cloud) and provided to each of the devices 224, 246, 252. The context modeler 250 can determine an emotion of a participant, a cue from a participant, or the like. The cue can include a spoken word phrase in the audio, a gesture in the video, an object in the video, or the like. For example, a participant can cause a personalized message to be provided responsive to the phrase "you will each receive a message indicating whether you completed X", "abracadabra", or the like. In another example, a participant can cause a personalized message to be provided responsive to a specified gesture (e.g., an "okay", swipe in a specified direction, pointing at a specified object, clicking a software control with a mouse, touching their head, scratching their face, blinking, or other hand, face, or body gesture). In another example, a participant can cause a personalized message to be provided responsive to a specified object appearing the stream 222. The object can be in an image in a presentation file, an object that a presenter places in a field of view of their camera, or the like.

The context modeler 250 can perform object recognition, speech recognition, gesture recognition, or a combination thereof using multiple means for doing so, such as for example multiple different machine learning models. Embodiments are not limited to specific techniques for object, speech, or gesture recognition. Some examples of these techniques are provided just for context as to what is meant by object, speech, and gesture recognition. Example object detection techniques include those that use computer-aided drafting (CAD) like object models, edge comparison-based models, greyscale matching, gradient matching, histograms of receptive field responses, interpretation trees, pose consistency, pose clustering, invariance, geometric hashing, scale-invariant feature transform (SIFT), speeded up robust features (SURF), bag of words, neural network (NN), among many others. Example gesture recognition techniques include three-dimensional (3D) model-based techniques, skeletal-based techniques, appearance-based techniques, electromyography-based techniques, or the like. Example speech recognition techniques include hidden Markov models, dynamic time warping-based speech recognition, NNs, and end-to-end automatic speech recognition.

The context modeler 250 can generate and provide context data 254 for the message generator 234. The context data 254 can include data from the meeting environment data 220, a result of speech or object recognition, or a combination thereof. The context data 254 can be provided as it is generated, at specified time intervals, periodically, or the like.

A presenter participant, or an agent of the presenter participant, can define message criteria 226 using their device 224. During meeting setup, a wizard can be presented by the device 224. The wizard can provide the presenter participant with options for message provision. A wizard, sometimes called a setup assistant, is a piece of software that provides a user interface that presents a user with a sequence of dialog boxes that lead the user through a series of well-defined steps. Since the data available to the message generator 234 can be limited, and the form of the personalized messages provided in the personalized views 248A-248D can be limited as well, the setup assistant can guide the user through possible message types and stop the user from trying to use an unsupported message condition or message type.

Using the wizard, setup assistant, or a UI provided as part of a conference application, the presenter participant can define message criteria 226. The message criteria 226 can include an indication of content of the message, one or more conditions that, when satisfied, cause the message to be presented to an attendee, recipient of a respective message, and form of the message. The conditions can include time of day, passage of time, object, gesture, phrase, a combination thereof, or the like. The content can include an image, text, audio, video, a clickable hyperlink or other software control, such as a button, or other data to be provided to the person indicated as the recipient. The content can be associated with criterion (sometimes called a characteristic condition because it is a condition that the user has a specified character trait or qualification), such that if a user satisfies the criterion, they receive that content. Some content can be default content (no criterion required to receive that content) and other content can be associated with criterion that, when satisfied, indicates that content is to be provided to the participant. The content criterion can be a profile parameter that can be derived from or expressly provided in a user profile for the participant. The profile parameter can indicate a job title, education status, expertise, task status, device type, current location other information about the attendee and available in the participant profiles, or the like.

The form of the message can include an indication how the message is presented. The form can include a type of message, such as a text box, a thought bubble, a video (e.g., as a thumbnail or over the primary display area 102 or secondary display area 104, or the like), a graphic, a scrolling text box, or the like. The form of the message can include a transparency, a font, a size of text or video, a color, a location of the message on the display (e.g., a display, a location on the display, such as background, corner, over presentation, or a combination thereof), a background pattern or image for the message, a customizable indicator that is provided along with the message that indicates to the participant that they have a message (e.g., a visual, audio, or tactile indicator), a combination thereof, or the like. The recipient can be any participant, an attendee or presenter participant. The recipient can be defined by name, email address, profile parameter, or the like.

The message generator 234 can receive the context 254 from the context modeler 250, message trigger data 230 from the messages and triggers 228, profile data 242 from the participant profiles 240, other data 236 from the external data 238, or a combination thereof. The external data 236 is any data relevant to a participant but accessed from outside an organization for which the person that setup the meeting works. The external data 236 can include public data, such as can be available from a social media platform, county, state, or city records, the Census Bureau or other governmental organization, an electronic mail (email) server, a combination thereof or the like. The profile data 242 is data relevant to the participant and accessed from within the organization. The profile data 242 can include job position, task completion (e.g., as part of a larger project or group), a knowledge graph, a combination thereof, or the like.

The context 254, external data 236, profile data 242, or a combination thereof can be used by the message generator 234 to determine whether a condition in the message trigger data 230 has been satisfied. Responsive to the conditions being satisfied, the message generator 234 can augment the A/V stream 222 to include the message indicated by the message criteria 226. In determining whether there are any messages associated with satisfied conditions, the message generator 234 can issue a query to the messages and triggers 228 that returns whether any of the context 254, external data 236, profile data 242, or any combination thereof, satisfy conditions of a message. The messages and triggers 228 can return any messages associated with conditions that have been satisfied along with data indicating a recipient of the messages and the format of the messages. The message generator 234 can then add the message to the A/V stream for each recipient and provide the PV 248A-248D to the corresponding recipient.

The context modeler 250 and the message generator 234 can include electric or electronic components arranged or programmed to perform operations thereof. The electric or electronic components can include one or more transistors, resistors, capacitors, diodes, amplifiers, switches, inductors, multiplexers, logic gates (e.g., AND, OR, XOR, negate, buffer, or the like), power supplies, memory devices, processing units (e.g., central processing units (CPUs), graphics processing units (GPUs), field programmable gate arrays (FPGAs), application specific integrated circuits (ASICs), or the like), analog to digital converters (ADCs), digital to analog converters (DACs), regulators, oscillators, or the like.

In some embodiments, the system 200 can generate messages and triggers and provide corresponding PVs 248A-248D automatically (without human interference after deployment). The automatic messages can be in addition to or alternative to manually defined messages. The automatic generation of messages can include the context modeler 250, the message generator 234, a combination thereof, or the like analyzing prior messages and triggers 228, external data 238, participant profiles 240, a meeting agenda, a knowledge graph, a combination thereof, or the like.

A knowledge graph 256 is not a database in a traditional sense of the word. Rather than being based on relational or object database models, the knowledge graph 256 is a graph database that maps relationships between users and their various activities. Graph databases are based on entities (or "nodes") and the mapped relationships (or "links") between them. Knowledge graphs are a good match for Web content, because in a way, the Web itself is a graph database—with its pages as nodes, and relationships represented by the hyperlinks connecting them. The entities in both Knowledge Graph and Satori from Microsoft Corporation are semantic data objects, each with a unique identifier, a collection of properties based on the attributes of the real-world topic they represent, and links representing the relationship from the topic to other entities. The entities also include actions that someone searching for that topic might want to take. Knowledge graph data 258 can be provided by the knowledge graph 256.

Figure 3:
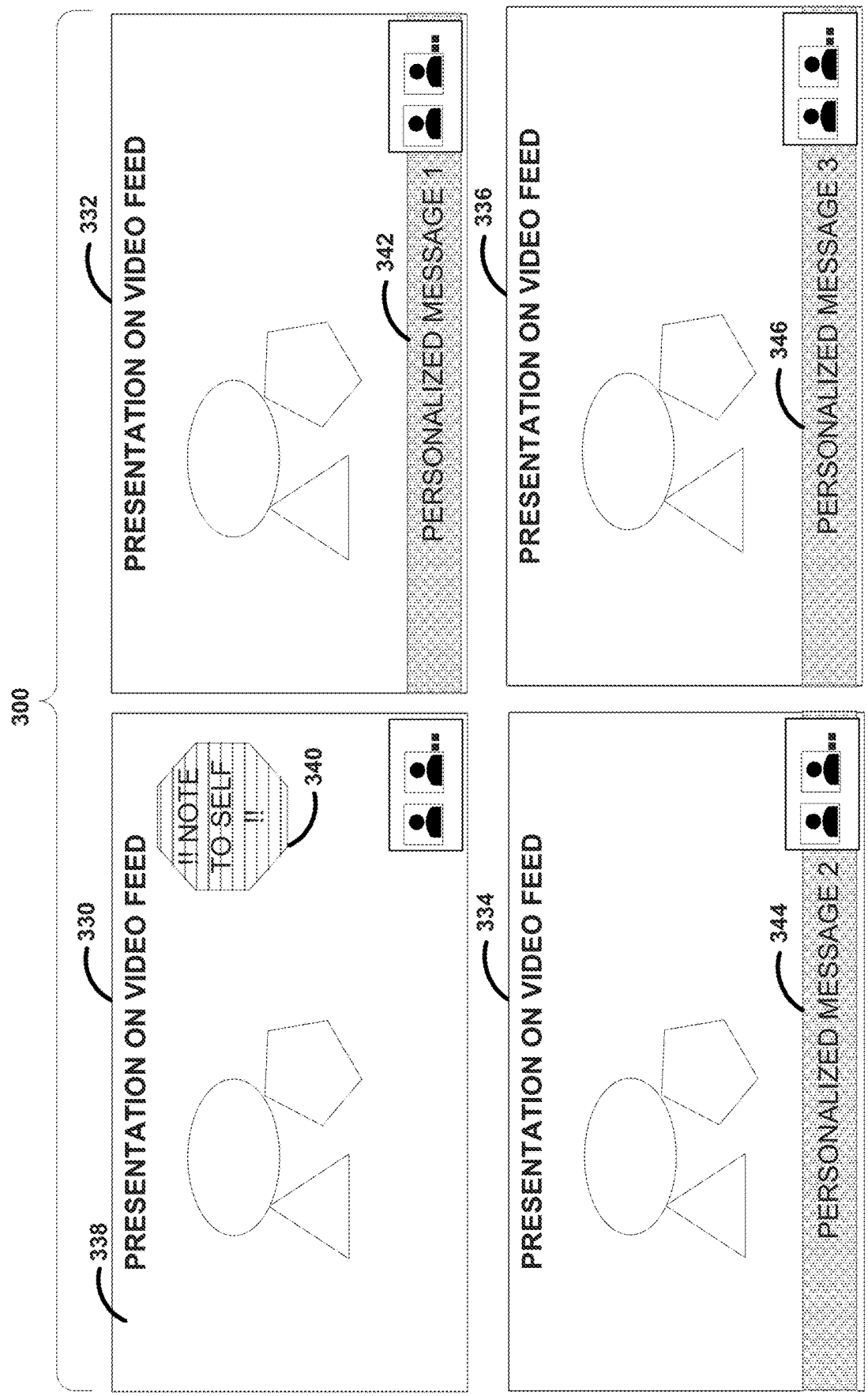
FIG. 3 illustrates, by way of example, a block diagram of UIs that include personalized, contextual messages for participants.

FIG. 3 illustrates, by way of example, a block diagram of UIs 300 that include personalized, contextual messages 340, 342, 344, 346 for participants. In the example of FIG. 3, each of the primary display areas includes a presentation 338 being presented by a presenter participant. The presenter participant has a first UI 330. The UI 330 includes a message 340 that is a reminder to the presenter. The reminder can be to slow down, ask a question, look at the camera, mention a fun fact, switch to presenting a different file, or any other note that the presenter would like to provide to themselves at a particular point in the presentation. The UIs 332, 334, 336 in the example of FIG. 3 are for attendee participants and each include a message 342, 344, 346, personalized to the participant. The personalized message 342, 344, 346 can indicate the type of health plan the attendee currently covering the attendee, a task (e.g., training, project, or other task) the attendee has or has not completed, a personalized fact or note from the presenter, or the like. Two or more of the personalized messages 342, 344, 346 can include same or different content. Each of the personalized messages 342, 344, 346 can be populated with content based on a characteristic of the attendee logged into the conference and associated with the UI 332, 334, 336, respectively, and whether the condition associated with the message 342, 344, 346 has been met.

Figure 4:
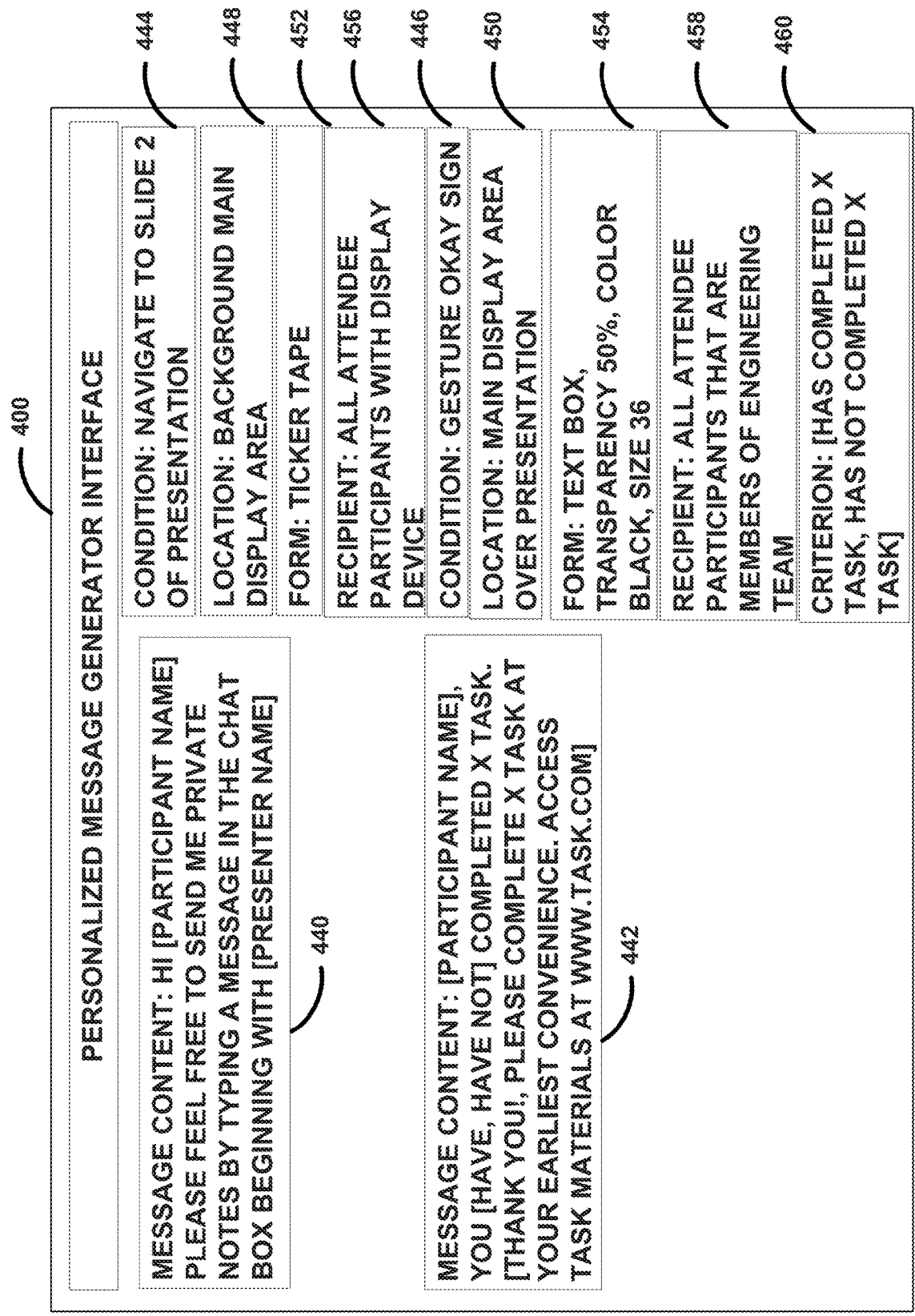
FIG. 4 illustrates, by way of example, a block diagram of a user interface through which a user can define contextual messages for providing to a participant of a conference.

FIG. 4 illustrates, by way of example, a block diagram of a user interface 400 through which a user can define contextual messages for providing to a participant of a conference. The UI 400 as illustrated includes input boxes 440, 442 in which a user can define content of the message. The content of the message can be customized per a user indication. In the example of FIG. 4, content in brackets is variable, such that the content in brackets is populated based on a participant characteristic if the condition and criterion defined in other input boxes are satisfied.

The participant characteristic can indicate user data, beyond their role in the conference. The role in the conference can indicate whether the user is a host, participant, organizer, presenter, agent, or the like. The role in the conference can be used to determine whether the user can define a message for the conference. For example, a host, organizer, or presenter can define messages for the conference. The host, organizer, or presenter can indicate other users that can define messages for the conference, these users are called "agents".

Input boxes 444, 446 provide an area in which a user can define conditions for triggering message delivery. Satisfaction of the condition defined in the input box 444, 446 does not guarantee that a message with the content in input boxes 440, 442 is delivered as the user can define recipients and criterion that provide further conditions for message delivery. The conditions defined can be stored in the messages and triggers 228. The context modeler 250 can use object recognition, speech recognition, a heuristic, or the like to determine whether the defined condition has been satisfied. For the condition "navigate to slide 2 of presentation", the context modeler 250 can identify that the presentation view includes "slide 2", a page number "2", that the user selected a "next slide" software control, or the like, to determine that condition has been satisfied. For the condition "gesture okay sign", the context modeler 250 can user object recognition to identify a hand performing an "okay" gesture. The gesture can be limited to only the presenter (the person talking or associated with a presenter role for the meeting). These are merely examples of conditions to provide understanding of embodiments. Other conditions and gestures are within the scope of embodiments. For example, a user can define a list of gestures and criterion corresponding to the gestures that control the message deployment.

Input boxes 448, 450 provide the user an ability to define a location (e.g., of a defined set of locations, a configurable location, a natural language description, or the like) on a display at which the message will appear if the condition, recipient, and criterion are satisfied. The input boxes 452, 454 provide the user an ability to define a form of the content of the message. The input boxes 456, 458 provide the user an ability to define recipient(s) of the message (assuming the condition and criterion are met). The recipient(s) can provide another condition for receiving the message. For example, the text box 456 limits the recipients to participants that are in attendance and using a display device to access the meeting. In another example, the input box 458 limits the recipients to participants that are in attendance and members of an engineering team. This information can be retrieved by the message generator 234, from the external data 238 or participant profiles 240.

The input box 460 allows a user to define criterion for receiving the message. In the example of FIG. 4, responsive to a gesture okay sign being detected (i) an attending participant named Fritz that is part of the engineering team and has completed X task will receive the message "Fritz, you have completed X task. Thank you!", (ii) an attending participant named Gert that is part of the engineering team and has not completed X task will receive the message "Gert, you have not completed X task. Please complete X task at your earliest convenience. Access task materials at www.task.com" and (iii) an attending participant that is not part of the engineering team will not receive a message. The criterion can be monitored by the message generator 234. The message generator 234 can access a database, such as the external data 238, participant profiles 240, or knowledge graph 256 to determine whether the participant satisfies the criterion. The criterion can be stored in the messages and triggers 228 in format that is consistent with the definition of the storage of data in the relevant database. In general, satisfaction of the conditions (or not) can be gleaned from the context 254 from the context modeler 250 and satisfaction of the criterion (or not) can be gleaned from data from the database(s) 238, 240, 256.

For text boxes with limited options, such as the input boxes 444, 446, 448, 450, 452, 454, 456, 458, 460, a drop-down menu, a radio button menu, or other indication of the available options can be provided to the user.

If a user does not specify a parameter, such as a location, size, color, other form parameter, criterion, recipient, condition, or the like, a default value can be used for that parameter. For example, a default font, color, size, transparency, and type can be chosen, default recipients can be all participants, default criterion can be null, default condition can be a start time of the meeting, and a default location can be the background of the main display area. Other defaults are possible and within the scope of embodiments.

Consider the example from the Background in which a conference regarding healthcare is being presented. Some employee participants may understand the difference between a high-deductible health plans (HDHPs) linked to health savings accounts (HSAs), health maintenance organization (HMO) plans, preferred provider organization (PPO) plans, or the like, but some may not. Due to time constraints and efficiency concerns, it may not be prudent to explain the differences between these health plans in a presentation. The context modeler 250, the message generator 234, or a combination thereof can automatically, or with user assistance, provide a message to a participant regarding the type of plan they are currently signed up for, an explanation of the differences between the plans, an explanation of circumstances under which each plan is beneficial to the participant, or the like. The message can be provided responsive to a condition being satisfied, such as the presenter mentioning the different healthcare plans offered, a participant having a bewildered look on their face, a participant exhibiting a specified emotion, or the like.

Figure 5:
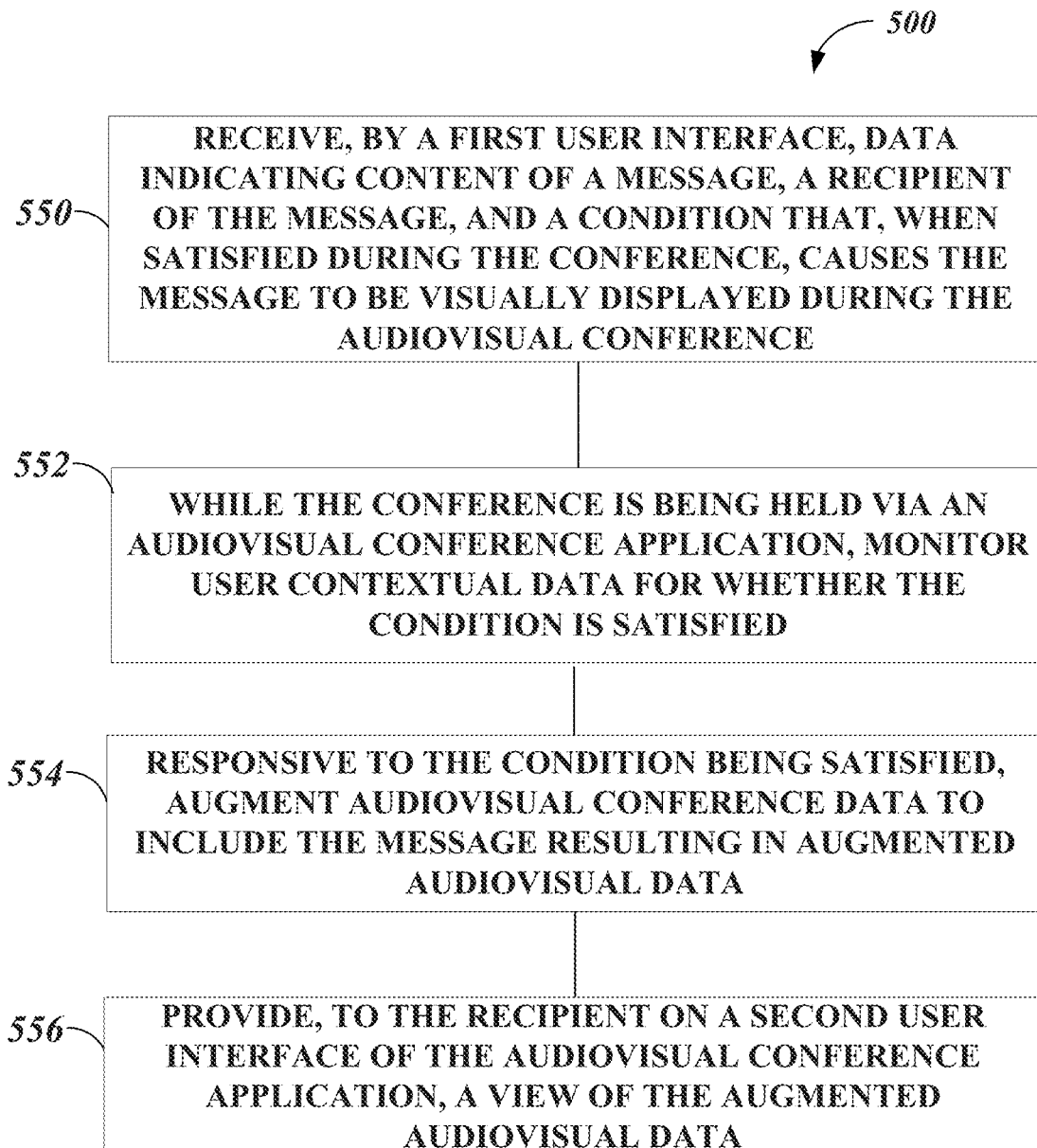
FIG. 5 illustrates, by way of example, a block diagram of an embodiment of a method for contextual messaging during a conference.

FIG. 5 illustrates, by way of example, a block diagram of an embodiment of a method 500 for contextual messaging during an audiovisual conference. The method 500 as illustrated receiving, by a first user interface, data indicating content of a message, a recipient of the message, and a condition that, when satisfied during the conference, causes the message to be visually displayed during the audiovisual conference, at operation 550; while the conference is being held via an audiovisual conference application, monitoring user contextual data for whether the condition is satisfied, at operation 552; responsive to the condition being satisfied, augmenting audiovisual conference data from the audiovisual conference application to include the message resulting in augmented audiovisual data, at operation 554; and providing, to the recipient on a second user interface of the audiovisual conference application, a view of the augmented audiovisual data, at operation 556. The audiovisual conference data can include audio from non-muted participants of the conference, visual data from a primary display area, secondary display area, chat window, or other visual display portion of the audiovisual conference application. The audiovisual conference application can be provided by a client, a remote server, a combination thereof, or the like. The user contextual data can include the context 254, profile parameter, data from one or more of the messages and triggers 230, external data 236, participant profiles 242, knowledge graph 258, meeting environment data 220, a combination thereof, or the like.

For a strictly audio conference or for a user that is experiencing the conference in an audio-only format (e.g., by dialing in without experiencing the video), the conference can be "paused" while a message is provided to the user(s) that are experiencing the conference in audio only. The pause in the video can allow for an audio form of the message to be presented without proceeding in the visual portion of the session. During the pause, a message can be displayed to those experiencing the conference visually. The message can indicate that the pause is to provide an audio message. In an embodiment in which the conference is recorded, the audiovisual conference can be augmented to include additional audio corresponding to the content of the messages to be presented. Note that the message generator 234, context modeler 250 or other portions of the system 200 can perform same operations whether a user is experiencing the audiovisual conference in real time or later.

The method 500 can further include, wherein the data further indicates a location on the second user interface to present the message and the content of the message is presented at the location on the second user interface. The method 500 can further include, wherein the data further indicates a form of the content of the message, the form including a type of presentation of the content, the type including ticker tape, thought bubble, notification, hyperlink, or text box. Messages can move between different formats, locations, or a combination thereof, depending on whether the messages have been noticed/acted on or not. For example, if a message is actionable (includes a survey, a clickable hyperlink or other action expectation by the user) and users are supposed to act but do not act, the message can be moved to a more noticeable location, the format of the message can be changed, or the like and re-presented to the user(s) that have not acted on the message.

The method 500 can further include, wherein the form further includes a visual transparency of the content of the message. The transparency level can, in some embodiments, signify a confidence in the relevance of the message to the current context of the audiovisual conference, an importance of the message, or the like. Additionally, or alternatively, a different component of the form of the message can be varied to indicate an importance of the message. For example, a background color of the audiovisual conference stream can be different for different messages, the formatting of the message can change to make it look more blended with the background (e.g., simulated whiteboard writing), or the like.

The method 500 can further include, wherein the recipient of the data includes a characteristic condition that indicates that only users that satisfy the characteristic condition receive the content of the message.

The method 500 can further include, wherein the data further includes a criterion that defines a further characteristic condition that defines which portions of the content of the message are provided to the recipient. The method 500 can further include, wherein the condition includes an event occurring in audiovisual data of the conference, the event including a gesture being performed, a phrase being spoken, a time elapsing, user contextual data check, or an object appearing.

The method 500 can further include receiving, by a first user interface, data indicating content of a second message, a second, different recipient of the second message, and a second condition that, when satisfied, causes the second message to be displayed during the conference. The method 500 can further include while the conference is being held via a conference application, monitoring, by the conference application, audiovisual data of the conference for whether the second condition is satisfied. The method 500 can further include responsive to the second condition being satisfied, augmenting the audiovisual data to include the second message resulting in second augmented audiovisual data. The method 500 can further include providing, to the second recipient on a third user interface of the conference application, a view of the augmented audiovisual data.

The method 500 can further include, wherein the recipient is only a presenter participant. If the recipient is only a presenter participant, the message is likely not in the background of the audiovisual stream of the presenter because many people do not like to watch themselves speak and presenting the message in the background of the audiovisual stream of the presenter could go unnoticed. Other locations in the audiovisual application, such as the current video being displayed in the primary display area 102, secondary display area 104, a chat window, a main conference application window, or the like. For software, like Teams®, the main conference application window remains open while the primary display area 102 and the secondary display area 104 provide audiovisual content of the conference allowing the message to be provided on the main conference application window. Other audiovisual conference software has a similar mode of operation. The message can be provided in a chat window of the main conference application window, as a notification through the main conference application window, or the like.

In some embodiments, the content, condition, location, form, recipient, criterion, or other message-relevant data can be specified in a first application and then monitored and implemented in a second application. The first application can include a presentation application that provides a user with an interface through which to generate the presentation. Example presentation applications include PowerPoint®, Keynote, Spark, Slides, among many others. The user interface 400, for example, can be presented as part of the presentation application, a plug-in to the presentation application, an extension to the presentation application, or the like. The message-relevant data can be stored in the messages and triggers 228 and associated with a presentation, such as by a file name or other identifier. Then, the message generator 234 can access the message-relevant data when the presentation is being provided.

U.S. patent application Ser. No. 15/992,795, titled "Calendar-Aware Resource Retrieval" and filed on May 30, 2018, regards meeting insights and is incorporated by reference herein in its entirety. Meeting insights technology can extract a potential task (e.g., commitment, request, follow-up, or the like) from email and provide a reminder to a user to complete the task. Meeting insights can identify relevant files for a user setting up a meeting or generating a presentation. Embodiments can include providing a message to a participant that is a reminder generated by meeting insights. The meeting insights can be stored in the meeting environment data 220. The context modeler 250 can generate a message with content, conditions, criterion, and format consistent with the meeting insight. The context modeler 250 can store the message-relevant data in the messages and triggers 228. The messages and triggers 228 can be monitored by the message generator 234 and the message can be provided if the conditions, criterion, or a combination thereof are satisfied. For example, if a reminder regards user X providing a document or following up with user Y, a message with content indicating that user X is to follow up with user Y and a condition of both user X and user Y being participants in the audiovisual conference can be generated (e.g., by the context modeler 250) stored in the messages and triggers 228. Then, when both user X and user Y are participants in the audiovisual conference, a message can be provided to user X indicating that the user X should follow up or provide the document to user Y during the audiovisual conference.

Figure 6:
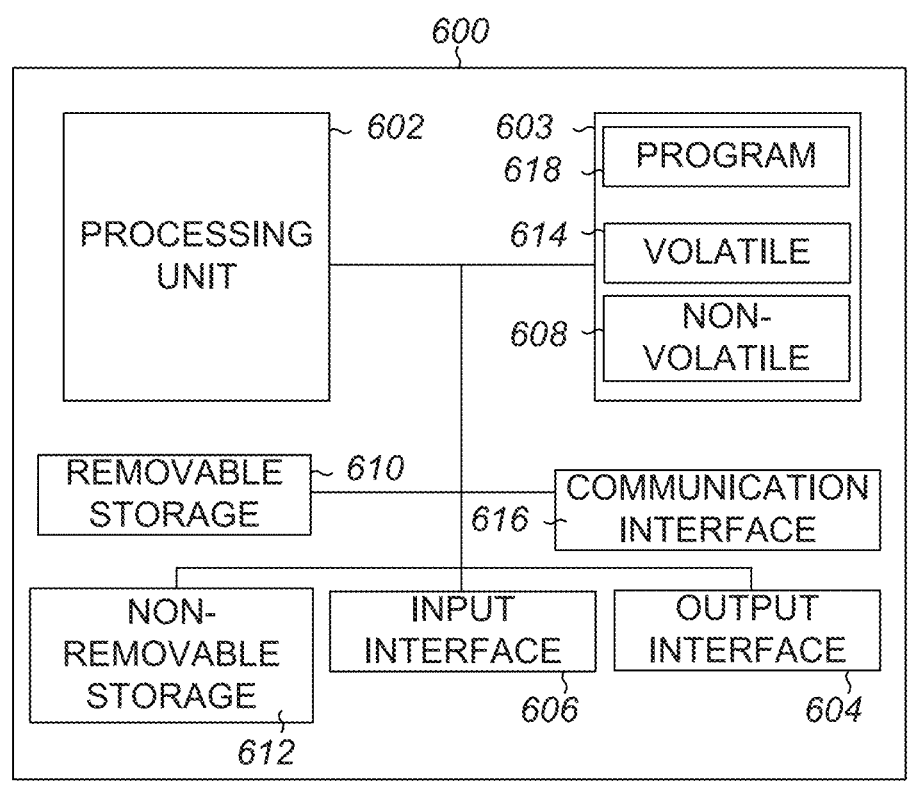
FIG. 6 illustrates, by way of example, a block diagram of an embodiment of a machine (e.g., a computer system) to implement one or more embodiments.

FIG. 6 illustrates, by way of example, a block diagram of an embodiment of a machine 600 (e.g., a computer system) to implement one or more embodiments. The machine 600 can implement a technique for improved contextual data provisioning in a conference. The context modeler 250, message generator 234, devices 224, 246, 252, or a component thereof can include one or more of the components of the machine 600. One or more of the context modeler 250, message generator 234, devices 224, 246, 252, method 500, or a component or operations thereof can be implemented, at least in part, using a component of the machine 600. One example machine 600 (in the form of a computer), may include a processing unit 602, memory 603, removable storage 610, and non-removable storage 612. Although the example computing device is illustrated and described as machine 600, the computing device may be in different forms in different embodiments. For example, the computing device may instead be a smartphone, a tablet, smartwatch, or other computing device including the same or similar elements as illustrated and described regarding FIG. 6. Devices such as smartphones, tablets, and smartwatches are generally collectively referred to as mobile devices. Further, although the various data storage elements are illustrated as part of the machine 600, the storage may also or alternatively include cloud-based storage accessible via a network, such as the Internet.

Memory 603 may include volatile memory 614 and non-volatile memory 608. The machine 600 may include— or have access to a computing environment that includes—a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 600 may include or have access to a computing environment that includes input 606, output 604, and a communication connection 616. Output 604 may include a display device, such as a touchscreen, that also may serve as an input device. The input 606 may include one or more of a touchscreen, touchpad, mouse, keyboard, camera, one or more device-specific buttons, one or more sensors integrated within or coupled via wired or wireless data connections to the machine 600, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 602 (sometimes called processing circuitry) of the machine 600. A hard drive, CD-ROM, and RAM are some examples of articles including a non-transitory computer-readable medium such as a storage device. For example, a computer program 618 may be used to cause processing unit 602 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on a digital signal processor, ASIC, microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like).

ADDITIONAL NOTES AND EXAMPLES

Example 1 can include a method for contextual messaging in an audiovisual conference, the method comprising receiving, by a first user interface, data indicating content of a message, a recipient of the message, and a condition that, when satisfied during the conference, causes the message to be visually displayed during the audiovisual conference, while the conference is being held via an audiovisual conference application, monitoring user contextual data for whether the condition is satisfied, responsive to the condition being satisfied, augmenting audiovisual conference data from the audiovisual conference application to include the message resulting in augmented audiovisual data, and providing, to the recipient on a second user interface of the audiovisual conference application, a view of the augmented audiovisual data.

In Example 2, Example 1 can further include, wherein the data further indicates a location on the second user interface to present the message and the content of the message is presented at the location on the second user interface.

In Example 3, at least one of Examples 1-2 can further include, wherein the audiovisual conference application is executed on a client or a server.

In Example 4, at least one of Examples 1-3 can further include, wherein the data further indicates a form of the content of the message, the form including a type of presentation of the content, the type including ticker tape, thought bubble, notification, hyperlink, or text box.

In Example 5, Example 4 can further include, wherein the form further includes a visual transparency of the content of the message.

In Example 6, at least one of Examples 1-5 can further include, wherein the recipient of the data includes a characteristic condition that indicates that only users that satisfy the characteristic condition receive the content of the message.

In Example 7, Example 6 can further include, wherein the data further includes a criterion that defines a further characteristic condition that defines which portions of the content of the message are provided to the recipient.

In Example 8, at least one of Examples 1-7 can further include, wherein the condition includes an event occurring in audiovisual data of the conference, the event including a gesture being performed, a phrase being spoken, a time elapsing, check of user contextual information, or an object appearing.

In Example 9, at least one of Examples 1-8 can further include, wherein the user contextual information includes a job title, education status, expertise, task status, training status, device type, or current location.

In Example 10, at least one of Examples 1-9 can further include receiving, by the first user interface, data indicating content of a second message, a second, different recipient of the second message, and a second condition that, when satisfied, causes the second message to be displayed during the conference, while the conference is being held via a conference application, monitoring, by the conference application, audiovisual data of the conference for whether the second condition is satisfied, responsive to the second condition being satisfied, augmenting the audiovisual data to include the second message resulting in second augmented audiovisual data, and providing, to the second recipient on a third user interface of the conference application, a view of the augmented audiovisual data.

In Example 11, at least one of Examples 1-10 can further include, wherein the recipient is only a presenter participant.

Example 12 can include a compute device comprising processing circuitry and a memory coupled to the processing circuitry, the memory including instructions that, when executed by the processing circuitry, cause the processing circuitry to perform operations for contextual messaging in an audiovisual conference, the operations comprising the method of at least one of Examples 1-11.

Example 13 can include a non-transitory machine-readable medium including instructions that, when executed by a machine, cause the machine to perform operations for contextual messaging in an audiovisual conference, the operations comprising the method of one of Examples 1-11.

Example 14 can include a user interface for an audiovisual conference compatible application, the user interface configured to perform operations comprising receiving data indicating content of a message, a recipient of the message, and a condition that, when satisfied during the conference, causes the message to be visually displayed during the audiovisual conference, and storing the received data such that, while the conference is being held via an audiovisual conference application, the audiovisual conference application monitors for whether the condition is satisfied and responsive to the condition being satisfied, augments the audiovisual data to include the message resulting in augmented audiovisual data.

In Example 15, Example 14 can further include, wherein the condition includes an event occurring in audiovisual data of the conference, the event including a gesture being performed, a phrase being spoken, a time elapsing, or an object appearing.

In Example 16, at least one of Examples 14-15 can further include, wherein the operations further comprise receiving data indicating content of a second message, a second, different recipient of the second message, and a second condition that, when satisfied, causes the second message to be displayed during the conference, and storing the received data such that, while the conference is being held via an audiovisual conference application, the audiovisual conference application monitors for whether the second condition is satisfied and responsive to the second condition being satisfied, augments the audiovisual data to include the second message resulting in second augmented audiovisual data.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for contextual messaging in an audiovisual conference, the method comprising:
   receiving, by a first user interface (UI), data indicating content of respective first and second messages, respective different recipients of the respective messages, and respective different conditions that, when satisfied during the conference, causes the respective messages to be visually displayed during the audiovisual conference;
   determining, based on audio data, video data, or a combination thereof of the audiovisual conference, whether any of the respective conditions are satisfied;
   responsive to determining the respective conditions associated with a satisfied message of the first message or the second message are satisfied, augmenting subsequent video data, audio data, or a combination thereof, to include the satisfied message resulting in augmented audiovisual data; and
   providing, to the respective recipients of the satisfied message and on a second UI of an audiovisual conference application, a view of the augmented audiovisual data.

2. The method of claim 1, wherein the data further comprises respective different formats in which to present the first and second messages.

3. The method of claim 2, wherein a format of the respective different formats varies based on an inference determined based on the audio data, the video data, or a combination thereof.

4. The method of claim 1, wherein the respective different recipients are defined based on their role in a company or a role in the audiovisual conference.

5. The method of claim 1, wherein the respective recipients include a presented for the first message and a participant for the second message.

6. The method of claim 1, wherein the data is provided by a presenter of the audiovisual conference and the respective recipients are participants.

7. The method of claim 1, wherein the data is provided by a participant of the audiovisual conference and the respective different recipients are presenters.

8. The method of claim 1, wherein the data further includes criterion that defines a characteristic of the recipients and which portions of the content of the satisfied message are provided to the recipients.

9. The method of claim 8, wherein the criterion is determined based on an organizational policy, user-specified, or inferred based on the audio data, visual data, or a combination thereof.

10. A compute device comprising:
processing circuitry; and
a memory coupled to the processing circuitry, the memory including instructions that, when executed by the processing circuitry, cause the processing circuitry to perform operations for contextual messaging in an audiovisual conference, the operations comprising:
receiving, by a first user interface (UI), data indicating content of respective first and second messages, respective different recipients of the respective messages, and respective different conditions that, when satisfied during the conference, causes the respective messages to be visually displayed during the audiovisual conference;
determining, based on audio data, video data, or a combination thereof of the audiovisual conference and using one or more machine learning models, whether any of the respective conditions are satisfied;
responsive to determining the respective conditions associated with a satisfied message of the first message or the second message are satisfied, augmenting subsequent video data, audio data, or a combination thereof, to include the satisfied message resulting in augmented audiovisual data; and
providing, to the respective recipients of the satisfied message and on a second UI of an audiovisual conference application, a view of the augmented audiovisual data.

11. The compute device of claim 10, wherein the data further comprises respective different formats in which to present the first and second messages.

12. The compute device of claim 11, wherein a format of the respective different formats varies based on an inference determined based on the audio data, the video data, or a combination thereof.

13. The compute device of claim 10, wherein the respective different recipients are defined based on their role in a company or a role in the audiovisual conference.

14. The compute device of claim 10, wherein the respective recipients include a presented for the first message and a participant for the second message.

15. The compute device of claim 10, wherein the data is provided by a presenter of the audiovisual conference and the respective recipients are participants.

16. The compute device of claim 10, wherein the data is provided by a participant of the audiovisual conference and the respective different recipients are presenters.

17. The compute device of claim 10, wherein the data further includes criterion that defines a characteristic of the recipients and which portions of the content of the satisfied message are provided to the recipients.

18. The compute device of claim 17, wherein the criterion is determined based on an organizational policy, user-specified, or inferred based on the audio data, visual data, or a combination thereof.

19. A non-transitory machine-readable medium including instructions that, when executed by a machine, cause the machine to perform operations comprising:
receiving data indicating content of respective first and second messages, respective different recipients of the respective messages, and respective different conditions that, when satisfied during an audiovisual conference, causes the respective messages to be visually displayed during the audiovisual conference;
storing the received data such that, while the conference is being held via an audiovisual conference application, the audiovisual conference application monitors audiovisual conference data for user contextual data, the audiovisual conference data including audio and video of the audiovisual conference, the video including data of images of multiple participants in the audiovisual conference;
responsive to receiving data indicating that the respective conditions associated with a satisfied message of the first message or the second message are satisfied, augmenting subsequent video data, audio data, or a combination thereof, to include the satisfied message resulting in augmented audiovisual data; and
providing, to the respective recipients of the satisfied message, a view of the augmented audiovisual data.

20. The non-transitory machine-readable medium of claim 19, wherein the data further indicates a format in which to present the first and second messages, the format including one of a ticker tape, thought bubble, notification, hyperlink, or text box for the first message and a different one of the ticker tape thought bubble, notification, hyperlink, or text box for the second message.

* * * * *